United States Patent
Oh et al.

(10) Patent No.: US 12,492,133 B2
(45) Date of Patent: Dec. 9, 2025

(54) METHOD FOR PURIFYING OF WASTE WATER

(71) Applicant: LG Chem, Ltd., Seoul (KR)

(72) Inventors: Suk Yung Oh, Daejeon (KR); Yong Heon Cho, Daejeon (KR); Joo Sik Oh, Daejeon (KR); Jun Seok Ko, Daejeon (KR); Kyeong Hyeon Jo, Daejeon (KR); Seung Whan Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/027,207

(22) PCT Filed: Jul. 25, 2022

(86) PCT No.: PCT/KR2022/010918
§ 371 (c)(1),
(2) Date: Mar. 20, 2023

(87) PCT Pub. No.: WO2023/090581
PCT Pub. Date: May 25, 2023

(65) Prior Publication Data
US 2024/0360006 A1 Oct. 31, 2024

(30) Foreign Application Priority Data

Nov. 17, 2021 (KR) .................. 10-2021-0158835
Jul. 1, 2022 (KR) .................. 10-2022-0081416

(51) Int. Cl.
*C02F 1/04* (2023.01)
*B01D 3/14* (2006.01)
(Continued)

(52) U.S. Cl.
CPC ............... *C02F 1/048* (2013.01); *B01D 3/14* (2013.01); *B01D 5/00* (2013.01); *C02F 1/40* (2013.01);
(Continued)

(58) Field of Classification Search
CPC ........ C02F 1/048; C02F 1/40; C02F 2101/16; C02F 2101/38; C02F 2103/38;
(Continued)

(56) References Cited

U.S. PATENT DOCUMENTS 3,507,755 A * 4/1970 Brandt .................. C07C 253/34
203/84
3,895,050 A * 7/1975 Sheely .................. C07C 253/34
558/466
(Continued)

FOREIGN PATENT DOCUMENTS

CA 2745498 A1 * 6/2010 ........... C07C 231/06
CN 105452301 A 3/2016
(Continued)

OTHER PUBLICATIONS

English translation of patent publication KR100587189B1, published Jun. 8, 2006. (Year: 2006).*
(Continued)

*Primary Examiner* — Joseph W Drodge
(74) *Attorney, Agent, or Firm* — Lerner David LLP

(57) ABSTRACT

A method for purifying of waste water includes: supplying a mixed stream, in which wastewater including water, a nitrile-based monomer, and ammonia and an acid component are mixed, to a first column; condensing an upper discharge stream of the first column, supplying the condensed stream to a decanter to separate the stream into a water layer and an organic layer, and supplying components of the organic layer to a second column; and separating a by-product from a lower discharge stream of the second column, and recovering the nitrile-based monomer from an upper discharge stream of the second column.

8 Claims, 2 Drawing Sheets

(51) Int. Cl.
  *B01D 5/00* (2006.01)
  *C02F 1/40* (2023.01)
  *C07C 253/34* (2006.01)
  *C02F 101/16* (2006.01)
  *C02F 101/38* (2006.01)
  *C02F 103/38* (2006.01)

(52) U.S. Cl.
  CPC ........ *C07C 253/34* (2013.01); *C02F 2101/16* (2013.01); *C02F 2101/38* (2013.01); *C02F 2103/38* (2013.01); *C02F 2209/02* (2013.01); *C02F 2209/03* (2013.01)

(58) Field of Classification Search
  CPC .............. C02F 2209/02; C02F 2209/03; C02F 2209/16; C02F 1/66; C02F 1/04; B01D 3/143; B01D 3/146; B01D 3/148; B01D 3/34; B01D 5/006; B01D 5/009; C07C 253/32; C07C 253/34
  See application file for complete search history.

(56) References Cited

U.S. PATENT DOCUMENTS

| | | | | |
|---|---|---|---|---|
| 4,434,029 | A * | 2/1984 | Kurihara | C07C 253/34 203/79 |
| 4,599,145 | A * | 7/1986 | Kawakami | C07C 253/34 203/99 |
| 4,661,614 | A | 4/1987 | Most et al. | |
| 4,808,344 | A | 2/1989 | Hallenburg et al. | |
| 5,334,313 | A * | 8/1994 | Anderson | C02F 3/1231 210/624 |
| 6,355,828 | B1 | 3/2002 | Rogers et al. | |
| 10,294,197 | B2 | 5/2019 | Sano | |
| 12,215,042 | B2 * | 2/2025 | Oh | C02F 1/043 |
| 2004/0181086 | A1 * | 9/2004 | Godbole | C07C 253/34 558/463 |
| 2004/0222078 | A1 | 11/2004 | Monical et al. | |
| 2005/0187401 | A1 * | 8/2005 | Godbole | C07C 253/34 558/463 |
| 2019/0031788 | A1 | 1/2019 | Kodemura et al. | |
| 2019/0047945 | A1 | 2/2019 | Sano | |
| 2021/0002391 | A1 | 1/2021 | Yoshimura et al. | |

FOREIGN PATENT DOCUMENTS

| | | | | |
|---|---|---|---|---|
| CN | 108779187 | A | 11/2018 | |
| JP | S57-093947 | A | 6/1982 | |
| JP | S62-212357 | A | 9/1987 | |
| JP | H05230007 | A | 9/1993 | |
| JP | H0759544 | B2 | 6/1995 | |
| JP | 2002518353 | A * | 6/2002 | ............... B01D 3/14 |
| JP | 2004526677 | A | 9/2004 | |
| JP | 2007039403 | A | 2/2007 | |
| JP | 2009196953 | A | 9/2009 | |
| JP | 2010222309 | A | 10/2010 | |
| JP | 2011063553 | A | 3/2011 | |
| KR | 19850001603 | B1 | 10/1985 | |
| KR | 19870008835 | A | 10/1987 | |
| KR | 20040065172 | A | 7/2004 | |
| KR | 100587189 | B1 * | 6/2006 | .......... C07C 253/34 |
| KR | 20160141786 | A | 12/2016 | |
| KR | 20180055796 | A | 5/2018 | |
| KR | 20200078104 | A | 7/2020 | |
| KR | 20200135326 | A | 12/2020 | |
| KR | 20210036151 | A | 4/2021 | |
| WO | WO-2004063145 | A1 * | 7/2004 | .......... C07C 253/26 |
| WO | 2012090691 | A1 | 7/2012 | |
| WO | WO-2015142775 | A1 * | 9/2015 | .......... C07C 253/34 |
| WO | 2015153190 | A1 | 10/2015 | |

OTHER PUBLICATIONS

English translation of patent publication JP2011063553A, published Mar. 31, 2011. (Year: 2011).*
English translation of JP_2002518353_A, published Jun. 25, 2002. (Year: 2002).*
Extended European Search Report including Written Opinion for Application No. 22865913.2 dated Jun. 5, 2024, pp. 1-8.
Search Report dated Apr. 16, 2025 from the Office Action for Chinese Application No. 202280006504.7 issued Apr. 24, 2025, pp. 1-2.
International Search Report for Application No. PCT/KR2022/010918 mailed Nov. 1, 2022, pp. 1-3.

* cited by examiner

【FIG. 1】
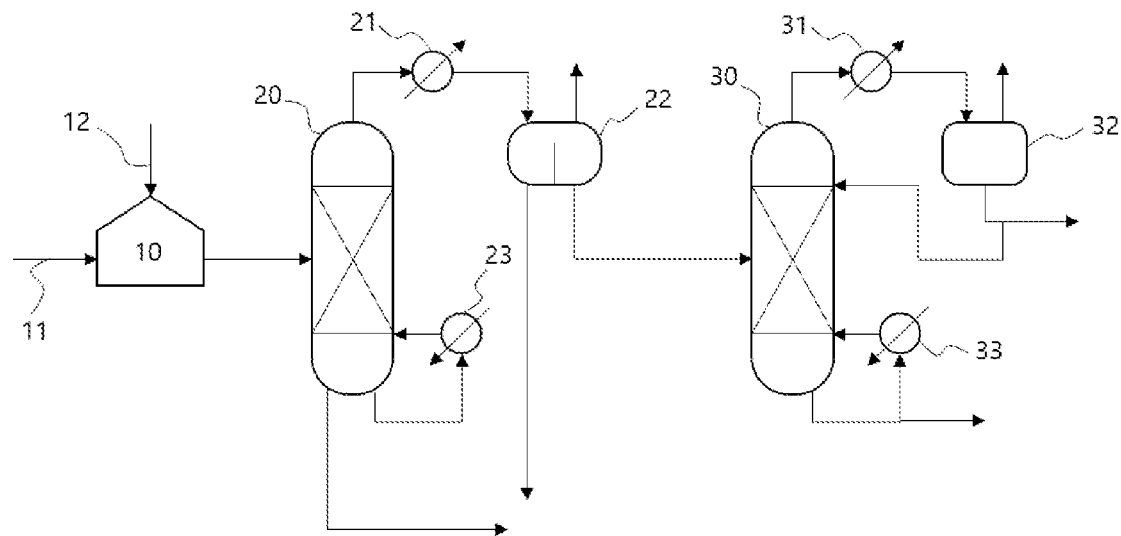
【FIG. 2】
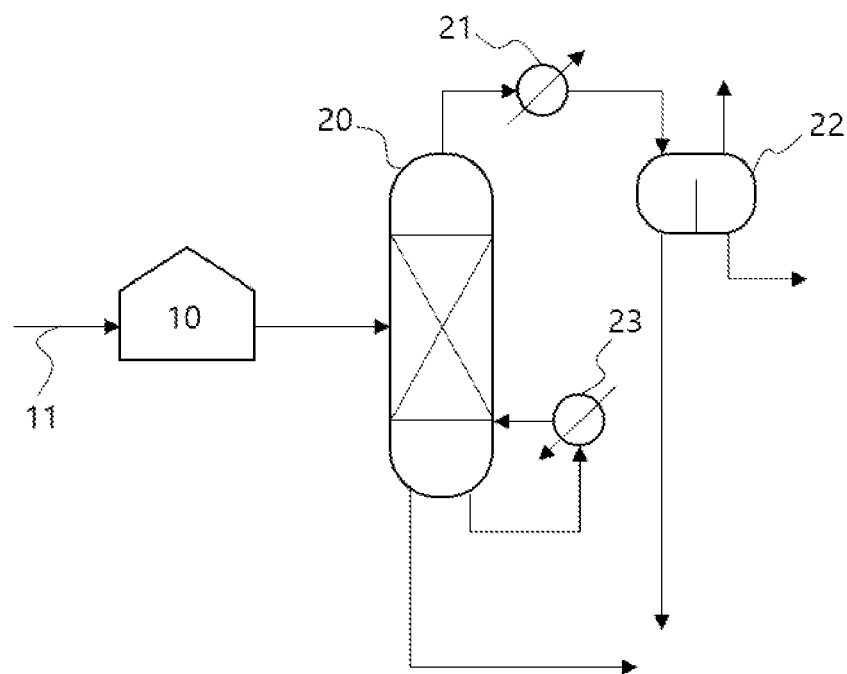

[FIG. 3]
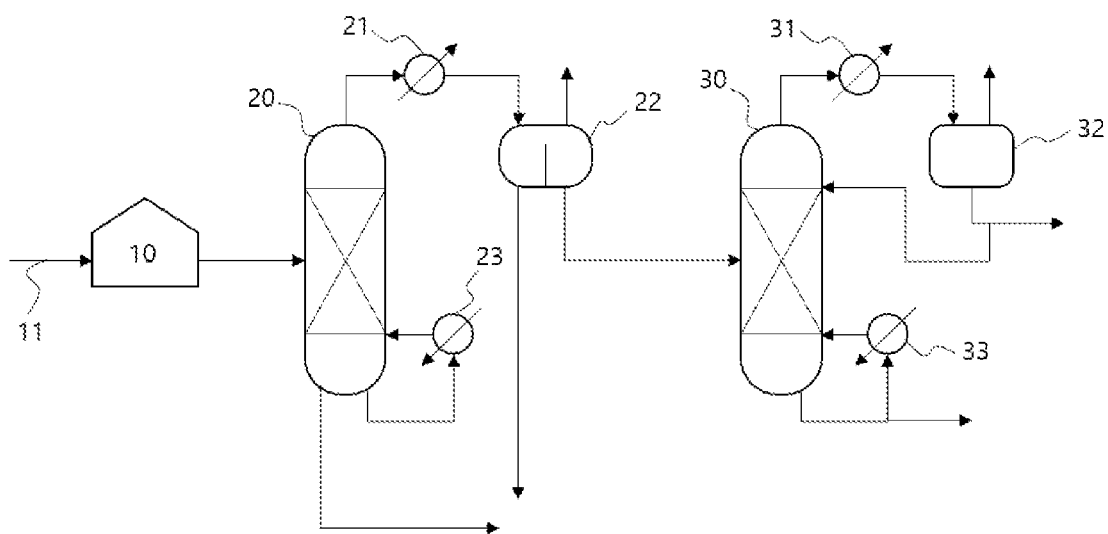

METHOD FOR PURIFYING OF WASTE WATER

CROSS-REFERENCE TO RELATED APPLICATIONS

The present application is a national phase entry under 35 U.S.C. § 371 of International Application No. PCT/KR2022/010918 filed on Jul. 25, 2022 which claims priority from Korean Patent Application No. 10-2021-0158835, filed on Nov. 17, 2021, and No. 10-2022-0081416, filed on Jul. 1, 2022, all of which are incorporated herein by reference.

TECHNICAL FIELD

The present disclosure relates to a method for purifying of waste water, and more particularly, to a method which may recover reusable components from wastewater in a purification step at a rear end of a polymerization reaction using a nitrile-based monomer and lower a total nitrogen content in the wastewater transferred to a wastewater treatment plant.

BACKGROUND ART

In general, a nitrile-based rubber may be obtained by manufacturing a homopolymer or copolymer latex including a nitrile-based monomer-derived unit, using a nitrile-based monomer. An example of the nitrile-based rubber may include an acrylonitrile-butadiene copolymer latex manufactured by copolymerizing acrylonitrile and 1,3-butadiene.

The nitrile-based rubber may be manufactured by emulsion polymerization, and the emulsion polymerization may be a method of polymerizing a monomer in a solution state, using a medium. The emulsion polymerization of the nitrile-based rubber may be performed by, for example, using water as a medium and performing polymerization by adding a nitrile-based monomer alone or further adding an additional monomer for copolymerization with the nitrile-based monomer, thereby manufacturing a homopolymer or copolymer latex including a nitrile-based monomer-derived unit therefrom.

The homopolymer or copolymer latex including the nitrile-based monomer-derived unit after polymerization is completed is transferred to a blowdown tank, and an unreacted material and water may be vaporized to the upper portion of the blowdown tank and transferred to a wastewater tank.

Meanwhile, in the blowdown tank, ammonia is added for adjusting the pH of latex, and may be partly vaporized with water to the upper portion and transferred to the wastewater tank. In this case, in the wastewater tank, 2 mol of an unreacted nitrile-based monomer and 1 mol of ammonia react to produce a trimer, resulting in a loss of the nitrile-based monomer.

In addition, wastewater remaining after recovering the nitrile-based monomer from the wastewater is transferred to a wastewater treatment plant. Here, since a total nitrogen (TN) content in wastewater which is transferred to the wastewater treatment plant is very high, a lot of money should be invested in the wastewater treatment plant for treating the wastewater, and in the midst of stricter environmental regulations, a large loss occurs in the price competitiveness of a latex product.

DISCLOSURE

Technical Problem

An object of the present technology is to provide a method which may prevent a loss in recovering an unreacted nitrile-based monomer in a manufacturing process of a homopolymer or copolymer latex including a nitrile-based monomer-derived unit and minimize a total nitrogen content in wastewater transferred to a wastewater treatment plant, in order to solve the problems mentioned in Background Art.

Technical Solution

In one aspect, a method for purifying of waste water includes: supplying a mixed stream including a wastewater and an acid component to a first column, wherein the wastewater includes water, a nitrile-based monomer, and ammonia; condensing an upper discharge stream of the first column to form a condensed stream, supplying the condensed stream to a decanter to separate the condensed stream into a water layer and an organic layer, and supplying components of the organic layer to a second column; and separating a by-product from a lower discharge stream of the second column, and recovering the nitrile-based monomer from an upper discharge stream of the second column.

Advantageous Effects

According to the method for purifying of waste water of the present technology, the loss of an unreacted nitrile-based monomer may be minimized and the nitrile-based monomer may be recovered and reused in a manufacturing process of a homopolymer or copolymer latex including a nitrile-based monomer-derived unit, thereby increasing cost competitiveness.

In addition, a total nitrogen content in purified wastewater transferred to a wastewater treatment plant is effectively lowered, thereby reducing the cost of investing in the wastewater treatment plant for wastewater treatment, and the product price competitiveness of a latex product is increased in the midst of stricter environmental regulations, thereby improving business sustainability and obtaining effects of reducing carbon emissions and reducing carbon taxes.

DESCRIPTION OF DRAWINGS

FIG. 1 is a process flow diagram according to the method for purifying of waste water in an exemplary embodiment of the present invention.

FIGS. 2 and 3 are process flow diagrams according to the method for purifying of waste water in the comparative examples, respectively.

DETAILED DESCRIPTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

The term "stream" in the present disclosure may refer to a fluid flow in a process, or may refer to a fluid itself flowing in a pipe. Specifically, the stream may refer to both a fluid itself flowing in a pipe connecting each device and a fluid flow. In addition, the fluid may include any one or more components of gas, liquid, and solid.

Hereinafter, the present technology will be described in more detail for better understanding with reference to FIG. 1 as an exemplary embodiment of the present invention.

According to an exemplary embodiment of the present invention, a method for purifying of waste water is provided. More specifically, the method may include: supplying a mixed stream including a wastewater and an acid component to a first column, wherein the wastewater includes water, a nitrile-based monomer, and ammonia; condensing an upper discharge stream of the first column to form a condensed stream, supplying the condensed stream to a decanter to separate the condensed stream into a water layer and an organic layer, and supplying components of the organic layer to a second column; and separating a by-product from a lower discharge stream of the second column, and recovering the nitrile-based monomer from an upper discharge stream of the second column.

According to an exemplary embodiment of the present invention, the wastewater may be produced from a manufacturing process of a homopolymer or copolymer latex including a nitrile-based monomer-derived unit. Specifically, the manufacturing process of a homopolymer or copolymer latex including the nitrile-based monomer-derived unit may include a polymerization step and a purification step.

The polymerization step may be performed by emulsion polymerization. In the emulsion polymerization, water may be used as a medium, and polymerization may be performed by adding a nitrile-based monomer alone or further adding an additional monomer for copolymerization with the nitrile-based monomer. For example, the additional monomer may include a conjugated diene-based monomer.

The nitrile-based monomer may include one or more selected from the group consisting of acrylonitrile, methacrylonitrile, fumaronitrile, α-chloronitrile, and α-cyanoethyl acrylonitrile. As a specific example, the nitrile-based monomer may be acrylonitrile.

The conjugated diene-based monomer may include one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene.

The purification step may be a step of separating an unreacted material and water from the homopolymer or copolymer latex including the nitrile-based monomer-derived unit after the polymerization is completed. Specifically, the homopolymer or copolymer latex including the nitrile-based monomer-derived unit after the polymerization is completed is transferred to a blowdown tank, and in the blowdown tank, the unreacted material and water may be vaporized to the upper portion and transferred to a wastewater tank 10.

In the blowdown tank, ammonia should be added for adjusting the pH of latex. However, in a process of vaporizing the unreacted material and water and transferring them to the wastewater tank 10 in the blowdown tank, a part of ammonia is vaporized water and introduced to the wastewater tank 10, so that in the wastewater tank 10, 2 mol of an unreacted nitrile-based monomer and 1 mol of ammonia react to produce a trimer referred to as 3,3-iminodipropionitrile, resulting in a loss of the nitrile-based monomer.

In addition, wastewater remaining after recovering the nitrile-based monomer from the wastewater is transferred to a wastewater treatment plant, and since conventionally, the trimer accounts for most of the total nitrogen content in wastewater and the total nitrogen content in wastewater transferred to the wastewater treatment plant is very high, a lot of money should be invested in the wastewater treatment plant for treating the wastewater, and in the midst of stricter environmental regulations, the price competitiveness of a latex product is decreased.

For this, the present technology is intended to provide a method for minimizing the loss of an unreacted nitrile-based monomer and a total nitrogen content in wastewater to reduce costs for a wastewater treatment and improve the price competitiveness of a latex product.

According to an exemplary embodiment of the present invention, the wastewater tank 10 may be supplied with wastewater including water, a nitrile-based monomer, and ammonia through a wastewater transfer line 11. In addition, an acid component may be added to the wastewater tank 10 through an acid component transfer line 12. The kind of acid component is not particularly limited, and for example, may include one or more selected from the group consisting of acetic acid, nitric acid, sulfuric acid, phosphoric acid, formic acid, and cyanic acid. As a specific example, the acid component may be acetic acid.

From the wastewater tank 10, a mixed stream in which the wastewater including water, a nitrile-based monomer, and ammonia and the acid component are mixed may be discharged, and the mixed stream may be supplied to a first column 20.

The mixed stream may be in a state in which the wastewater is mixed with the acid component so that the pH of the wastewater is lowered. For example, the pH of the mixed stream may be 1.5 or more, 2.5 or more, or 3.5 or more and 4.5 or less, 5 or less, or 5.5 or less. By adjusting the pH of the mixed stream to the above range, ammonia (NH3) in the mixed stream may be converted into an ammonium salt (NH4+) to prevent formation of a trimer due to a side reaction of the nitrile-based monomer and ammonia, thereby decreasing the loss of the nitrile-based monomer. In addition, the trimer of the nitrile-based monomer is a component accounting for most of the total nitrogen content in wastewater, and purified wastewater in which the total nitrogen content is decreased by preventing formation of the trimer may be transferred to a wastewater treatment plant.

According to an exemplary embodiment of the present invention, the mixed stream may be supplied to a first column 20. The first column 20 separates the components of the mixed stream by distillation, and the nitrile-based monomer and the by-product included in the mixed stream are separated to an upper portion, and the remaining components are separated to a lower portion, in the first column 20. Here, the by-product may include a dimer of the nitrile-based monomer. In addition, the remaining components separated to the lower portion of the first column 20 is purified wastewater, and a part of the components may be heated in a common reboiler 23 and refluxed to the first column 20, and the rest may be transferred to the wastewater treatment plant.

The upper discharge stream of the first column 20 may be condensed in a condenser 21 and then supplied to a decanter 22. From the decanter, flare gas is discharged, and the condensed upper discharge stream of the first column 20 (a condensed stream) may be separated into a water layer and an organic layer. The water layer components separated in the decanter 22 are purified wastewater and may be transferred to the wastewater treatment plant.

Since the formation of the trimer of the nitrile-based monomer is prevented, and the nitrile-based monomer and the dimer of the nitrile-based monomer in wastewater are separated in the first column 20, the total nitrogen content in the purified wastewater transferred to the wastewater treatment plant may be decreased. For example, a ratio of a total nitrogen content in purified wastewater to a total nitrogen content in wastewater may be 0.25 or more, 0.3 or more, or 0.35 or more and 0.5 or less or 0.55 or less.

An operating temperature of the first column 20 may be 80° C. or higher, 90° C. or higher, or 95° C. or higher and 100° C. or lower, 110° C. or lower, or 130° C. or lower. In addition, an operating pressure of the first column 20 may be 0.5 bar or more, 0.7 bar or more, or 0.9 bar or more and 1.5 bar or less, 2 bar or less, or 3 bar or less. By controlling the operating conditions of the first column 20 to the above ranges, the nitrile-based monomer may be effectively separated to the upper portion.

According to an exemplary embodiment of the present invention, organic layer components separated from the decanter 22 may include a by-product together with the nitrile-based monomer, and may be supplied to a second column 30 in order to separate the nitrile-based monomer and the by-product.

The second column 30 may separate the nitrile-based monomer and the by-product including the nitrile-based dimer in the organic layer components separated in the decanter 22 by distillation. Specifically, nitrile-based monomer may be recovered from an upper discharge stream, and the by-product may be separated as a lower discharge stream, of the second column 30.

According to an exemplary embodiment of the present invention, a part of the lower discharge stream of the second column 30 may be passed through a heat exchanger 33 to be refluxed to the second column 30, and the rest of the stream may be discharged.

The heat exchanger 33 may be, for example, a shell-tube heat exchanger. The shell-tube heat exchanger may be formed of a cylindrical body, a pipe-shaped tube which is provided in the center of the body and transfers a fluid, and a shell surrounding the tube. A refrigerant or a warm medium supplied to the shell may flow while being in contact with the fluid transferred through the tube through a tube outer wall and exchange heat with the fluid transferred through the tube. Specifically, the lower discharge stream of the second column 30 is supplied to the tube of the heat exchanger 33 and moves from the inlet to the outlet of the tube. Here, a heat source supplied to the shell moves from the inlet to the outlet of the shell, and may exchange heat with the lower discharge stream of the second column 30 moving in the tube, in the outer wall of the tube. Thus, the lower discharge stream of the second column 30 supplied to the tube may be heated with the heat source passing through the shell and refluxed to the second column 30.

Meanwhile, when the lower discharge stream of the second column 30 passes through the heat exchanger 33, the polymerization reaction of the nitrile-based monomer included in the lower discharge stream passing through the tube may occur by heat supplied from the heat source passing through the shell. A polymer produced by the polymerization reaction may cause a fouling phenomenon in which the polymer is partially precipitated and accumulated in the tube. Since the fouling phenomenon prevents smooth movement of a fluid, it adversely affects the entire process.

Thus, in the present technology, the operation conditions of the second column 30 and the heat exchanger 33 are controlled, thereby suppressing fouling occurring in the heat exchanger 33, which allows stable operation to reduce time and costs for washing.

A temperature of the heat source supplied to the shell of the heat exchanger 33 may be, for example, the 60° C. or higher, 65° C. or higher, or 70° C. or higher and 80° C. or lower, 85° C. or lower, or 90° C. or lower. When the temperature of the heat source is too high, the polymerization reaction of the nitrile-based monomer due to a local temperature rise and the production of a polymerized polymer therefrom may be caused in the outer wall of the tube where the lower discharge stream of the second column 30 moves. Meanwhile, when the temperature of the heat source is too low, the production of the polymerized polymer may be suppressed, but the size of the heat exchanger required for sufficient heat exchange is increased. The heat source may be, for example, hot water.

Meanwhile, as described above, a part of the lower discharge stream of the second column 30 may be passed through the heat exchanger 33 to be refluxed to the second column 30, and the rest of the stream may be discharged. A fouling phenomenon by a polymerized polymer of the nitrile-based monomer may occur also in the reflux pipe which passes through the heat exchanger 33 and is refluxed to the second column 30. In order to prevent this, it is necessary to transfer the fluid flowing the reflux pipe by maintaining it in a liquid state. In the case in which the lower discharge stream of the second column 30 in a liquid state in the reflux pipe is partly vaporized, the polymerization reaction of the nitrile-based monomer in an interface between the liquid and the gas may be accelerated to cause the fouling phenomenon. Therefore, it is necessary to maintain pressure in the reflux pipe at a certain level or higher.

For this, the pressure in the reflux pipe may be maintained at 0.5 bar or more, 1 bar or more, or 1.5 bar or more and 2.5 bar or less, 3.0 bar or less, or 3.5 bar or less. Furthermore, in order to control the pressure range as such, in an exemplary embodiment of the present invention, a pressure adjusting valve may be provided in the reflux pipe.

A temperature of a lower portion of the second column 30 may be 20° C. or higher, 25° C. or higher, or 30° C. or higher and 35° C. or lower, 40° C. or lower, or 45° C. or lower. By maintaining the temperature of a lower portion of the second column 30 within the above range, the polymerization reaction of the nitrile-based monomer occurring by heat may be suppressed to prevent the fouling phenomenon of the heat exchanger.

A content of the nitrile-based monomer in the lower discharge stream of the second column 30 may be 5 wt % or more, 10 wt % or more, or 15 wt % or more and 20 wt % or less, 30 wt % or less, or 40 wt % or less. Specifically, in the above range, a part of the nitrile-based monomer may flow out to the lower discharge stream of the second column 30, and in this case, the temperature of a lower portion of the second column 30 may be easily maintained.

According to an exemplary embodiment of the present invention, the upper discharge stream of the second column 30 may be condensed in a condenser 31 and then supplied to a reflux tank 32. The upper discharge stream of the second column 30 which has been condensed in the condenser 31 discharges flare gas to the upper portion of the reflux tank 32, a part of the lower discharge stream including the nitrile-based monomer is refluxed to the second column 30, and the rest is recovered and may be reused in the polymerization step of the manufacturing process of a homopolymer or copolymer latex including the nitrile-based monomer-derived unit.

The operating pressure of the second column 30 may be 0.15 bar or more, 0.2 bar or more, or 0.25 bar or more and 0.4 bar or less, 0.45 bar or less, or 0.5 bar or less. For example, when the operating pressure of the second column 30 is lower than the above range, condensation in the condenser 31 may not be performed well, and when the operating pressure is higher than the above range, the temperature is also raised, and thus, fouling due to the polymerized polymer of the nitrile-based monomer may occur in the heat exchanger and the reflux pipe described above.

According to an exemplary embodiment of the present invention, in the method for purifying of waste water, if necessary, devices such as a distillation tower, a condenser, a reboiler, a valve, a pump, a separator, and a mixer may be further installed.

Hereinabove, the method for purifying of waste water according to the present technology has been described and illustrated in the drawings, but the description and the illustration in the drawings are the description and the illustration of only core configurations for understanding of the present technology, and in addition to the process and devices described above and illustrated in the drawings, the process and the devices which are not described and illustrated separately may be appropriately applied and used for carrying out the method for purifying of waste water according to the present technology.

Hereinafter, the present technology will be described in more detail by the examples. However, the following examples are provided for illustrating the present technology, and it is apparent to a person skilled in the art that various modifications and alterations may be made without departing from the scope and spirit of the present technology and the scope of the present technology is not limited thereto.

EXAMPLES

Example 1

According to the process flow diagram illustrated in FIG. 1, wastewater discharged from a manufacturing process of an acrylonitrile-butadiene copolymer latex was purified.

Specifically, wastewater, which included water, an acrylonitrile monomer, and ammonia and had a pH of 8, was supplied to a wastewater tank 10 through a wastewater transfer line 11, acetic acid was added to the wastewater tank 10 through an acid component transfer line 12, and a mixed stream discharged from the wastewater tank 10 was supplied to a first column 20. At this time, it was confirmed that the total nitrogen content of the wastewater was 6,000 ppm, the pH of the mixed stream was 5.5, and the total nitrogen content was measured using a commercialized total nitrogen (TN) measuring device.

The upper discharge stream of the first column 20 was condensed in a condenser 21 and supplied to a decanter 22, in the decanter 22, flare gas was discharged therefrom and the stream was separated into a water layer and an organic layer, and the organic layer components were transferred to a second column 30 and the water layer components were transferred to a wastewater treatment plant as purified wastewater. In addition, a part of the lower discharge stream of the first column 20 was heated using a reboiler 23 and then refluxed, and the rest was transferred to the wastewater treatment plant as purified wastewater. At this time, the operating temperature of the first column 20 was 90° C., and the operating pressure was adjusted to 1 bar. In addition, the total nitrogen content in the purified wastewater was confirmed to be 3,000 ppm.

The upper discharge stream of the second column 30 was condensed in a condenser 31 and then supplied to a reflux tank 32, flare gas was discharged from the reflux tank 32, a part of the lower discharge stream was refluxed, and the nitrile-based monomer was recovered from the rest and reused. In addition, a part of the lower discharge stream of the second column 30 was passed through a heat exchanger 33 and refluxed to the second column 30, and a by-product was separated from the rest. At this time, the content of the nitrile-based monomer in the lower discharge stream of the second column 30 was adjusted to 15 wt %, and the temperature of warm water supplied to the shell of the heat exchanger 33 was 90° C. In addition, the operating pressure of the second column 30 was adjusted to 0.3 bar, and the temperature of a lower portion was maintained at 45° C.

In this case, fouling occurrence in the heat exchanger 33 and the condenser 31 was suppressed to extend a wash cycle, and the recovery rate of acrylonitrile calculated by the content ratio of the acrylonitrile monomer recovered from the upper discharge stream of the second column 30 to the content of the acrylonitrile monomer included in the wastewater supplied to the wastewater tank 10 was confirmed to be 99.9%.

Example 2

The operation was performed in the same manner as in Example 1, except that the content of the nitrile-based monomer in the lower discharge stream of the second column 30 was controlled to 10 wt %, and the temperature of a lower portion of the second column 30 was controlled to 50° C.

In this case, it was confirmed that fouling occurrence in the heat exchanger 33 promoted as compared with Example 1, thereby shortening the wash cycle.

Example 3

The operation was performed in the same manner as in Example 1, except that the temperature of the warm water supplied to the shell of the heat exchanger 33 was adjusted to 100° C.

In this case also, it was confirmed that fouling occurrence in the heat exchanger 33 was promoted as compared with Example 1, thereby shortening the wash cycle.

Example 4

The operation was performed in the same manner as in Example 1, except that the operating pressure of the second column 30 was controlled to 0.1 bar.

In this case, the upper discharge stream of the second column 30 was not condensed well in the condenser 31, and thus, the amount of the nitrile-based monomer lost in the discharge of the flare gas from the reflux tank 32 was increased.

Example 5

The operation was performed in the same manner as in Example 1, except that the operating pressure of the second column 30 was controlled to 0.7 bar.

In this case, it was confirmed that fouling occurrence in the condenser 31 was promoted as compared with Example 1, thereby shortening the wash cycle.

Comparative Examples

Comparative Example 1

According to the process flow diagram illustrated in FIG. 2, wastewater discharged from the manufacturing process of an acrylonitrile-butadiene copolymer latex was purified.

Specifically, wastewater which included water, an acrylonitrile monomer, and ammonia and had a pH of 8 was supplied to the wastewater tank 10 through the wastewater transfer line 11, and the wastewater was discharged from the wastewater tank 10 and supplied to the first column 20. At this time, the total nitrogen content of the wastewater was confirmed to be 6,000 ppm.

The upper discharge stream from the first column 20 was condensed in the condenser 21 and supplied to the decanter 22, in the decanter 22, flare gas was discharged therefrom and the stream was separated into a water layer and an organic layer, acrylonitrile was recovered from the organic layer components, and the water layer components were transferred to the wastewater treatment plant as purified wastewater. In addition, a part of the lower discharge stream of the first column 20 was heated using the reboiler 23 and then refluxed, and the rest was transferred to the wastewater treatment plant as purified wastewater. At this time, the operating temperature of the first column 20 was 90° C., and the operating pressure was adjusted to 1 bar. In addition, the total nitrogen content of the purified wastewater was confirmed to be 5,000 ppm, and the recovery rate of acrylonitrile calculated from a ratio of the content of the acrylonitrile monomer recovered from the organic layer components in the decanter 22 to the content of the acrylonitrile monomer included in the wastewater supplied to the wastewater tank 10 was confirmed to be 30%.

Furthermore, since a dimer component of the nitrile-based monomer was also mixed in the organic layer components in addition to acrylonitrile, it was impossible to reuse the recovered stream in polymerization.

Comparative Example 2

According to the process flow diagram illustrated in FIG. 3, wastewater discharged from a manufacturing process of an acrylonitrile-butadiene copolymer latex was purified.

Specifically, the process was performed in the same manner as in Example 1, except that acetic acid was not added to the wastewater tank 10.

In this case, the total nitrogen content of the purified wastewater was confirmed to be 5,000 ppm, and the recovery rate of acrylonitrile calculated from a ratio of the content of the acrylonitrile monomer recovered from the upper discharge stream of the second column 30 to the content of the acrylonitrile monomer included in the wastewater supplied to the wastewater tank 10 was confirmed to be 30%.

The invention claimed is:

1. A method for purifying of waste water comprising:
   supplying a mixed stream including a wastewater and an acid component, added to the wastewater to lower the wastewater pH, to a first column, wherein the wastewater includes water, a nitrile-based monomer, and ammonia;
   condensing an upper discharge stream of the first column to form a condensed stream, supplying the condensed stream to a decanter to separate the condensed stream into a water layer and an organic layer, and supplying components of the organic layer to a second column; and
   separating a by-product from a lower discharge stream of the second column, and recovering the nitrile-based monomer from an upper discharge stream of the second column,
   wherein a pH of the mixed stream ranges from 1.5 to 5.0, and
   wherein the acid component includes one or more of acetic acid, nitric acid, sulfuric acid, phosphoric acid, formic acid, or cyanic acid.

2. The method for purifying of waste water of claim 1, further comprising transferring a lower discharge stream of the first column and components of the water layer from the decanter to a wastewater treatment plant as purified wastewater.

3. The method for purifying of waste water of claim 1, wherein an operating pressure of the first column ranges from 0.5 bar to 3.0 bar, and an operating temperature of the first column ranges from 80° C. to 130° C.

4. The method for purifying of waste water of claim 1, wherein an operating pressure of the second column ranges from 0.15 bar to 0.5 bar.

5. The method for purifying of waste water of claim 1, wherein a temperature of a lower portion of the second column ranges from 20° C. to 45° C.

6. The method for purifying of waste water of claim 1, wherein a content of the nitrile-based monomer in the lower discharge stream of the second column ranges from 5 wt % to 40 wt % relative to a total content of the lower discharge stream of the second column.

7. The method for purifying of waste water of claim 1, wherein a part of the lower discharge stream of the second column is passed through a heat exchanger and refluxed to the second column, and the by-product is separated from a remainder of the lower discharge stream of the second column.

8. The method for purifying of waste water of claim 7, wherein the part of the lower discharge stream of the second column is passed through a tube of the heat exchanger, and
   a temperature of a heat source supplied to a shell of the heat exchanger ranges from 60° C. to 90° C.

* * * * *